(12) United States Patent
Bakucz

(10) Patent No.: US 11,087,619 B2
(45) Date of Patent: Aug. 10, 2021

(54) METHOD AND DEVICE FOR DETERMINING AN OCCUPANCY STATE OF A PARKING SPACE OF A PARKING FACILITY

(71) Applicant: Robert Bosch GmbH, Stuttgart (DE)

(72) Inventor: Peter Bakucz, Klosterlechfeld (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 16/954,797

(22) PCT Filed: Dec. 14, 2018

(86) PCT No.: PCT/EP2018/084891
§ 371 (c)(1),
(2) Date: Jun. 17, 2020

(87) PCT Pub. No.: WO2019/121370
PCT Pub. Date: Jun. 27, 2019

(65) Prior Publication Data
US 2021/0097856 A1 Apr. 1, 2021

(30) Foreign Application Priority Data
Dec. 22, 2017 (DE) .......................... 102017223702.3

(51) Int. Cl.
*G08G 1/042* (2006.01)
*G01V 3/08* (2006.01)
*G08G 1/14* (2006.01)

(52) U.S. Cl.
CPC .............. *G08G 1/042* (2013.01); *G01V 3/087* (2013.01); *G08G 1/141* (2013.01); *G08G 1/146* (2013.01)

(58) Field of Classification Search
CPC .......... G08G 1/042; G08G 1/14; G08G 1/146; G08G 1/148; G01V 3/081
See application file for complete search history.

(56) References Cited

U.S. PATENT DOCUMENTS

| | | | | |
|---|---|---|---|---|
| 2006/0136131 A1* | 6/2006 | Dugan | ...................... | G08G 1/14 701/300 |
| 2007/0050240 A1* | 3/2007 | Belani | ...................... | G08G 1/14 705/13 |

(Continued)

FOREIGN PATENT DOCUMENTS

| | | |
|---|---|---|
| DE | 102015219735 A1 | 4/2017 |
| JP | H11144187 A | 5/1999 |

OTHER PUBLICATIONS

International Search Report for PCT/EP2018/084891, dated Mar. 22, 2019.

(Continued)

*Primary Examiner* — Mirza F Alam
(74) *Attorney, Agent, or Firm* — Norton Rose Fulbright US LLP; Gerard Messina

(57) ABSTRACT

A method for determining an occupancy state of a parking space of a parking facility, including the following method steps: a. detecting magnetic field measured values in the surroundings of the parking space along an axis with the aid of a magnetic field sensor within a predefined duration; b. forming a Poincaré diagram as a function of the magnetic field measured values detected in method step a; c. determining a line of best fit through the points of the Poincaré diagram formed in method step b, with the aid of linear regression; d. determining differences in the vertical direction between the line of best fit and the respective points; e. calculating a mean value of the differences determined in method step d; and f. determining the occupancy state of the parking space as a function of the mean value calculated in method step e.

9 Claims, 4 Drawing Sheets

(56) References Cited

U.S. PATENT DOCUMENTS

| | | | | |
|---|---|---|---|---|
| 2010/0026521 A1* | 2/2010 | Noel, II | ................ | G08G 1/042 340/932.2 |
| 2011/0163894 A1* | 7/2011 | Grievink | ................ | G08G 1/042 340/932.2 |
| 2018/0181144 A1* | 6/2018 | Steinmann | ............. | G05D 1/104 |

OTHER PUBLICATIONS

Anonymous. "Poincaré Plot—Wikipedia", 2017, pp. 1-2. https://en.wikipedia.org/w/index.php?title=poincaré_plot&oldid=807013634 Retrieved on Mar. 15, 2019 XP055569911.

* cited by examiner ated in method step c, respectively; the Monte Carlo method may be used in the process, which has the advantage that it may be applied in an embedded system.

METHOD AND DEVICE FOR DETERMINING AN OCCUPANCY STATE OF A PARKING SPACE OF A PARKING FACILITY

FIELD

The present invention relates to a method for determining an occupancy state of a parking space of a parking facility.

BACKGROUND INFORMATION

Japan Patent Application No. JP 11144187 A describes, for example, a system and a method for detecting vehicles on a parking lot. This patent application describes a magnetic sensor. The magnetic sensor detects the earth's magnetic field in its immediate surroundings in a three-dimensional manner and identifies changes, for example as a result of the parking of a motor vehicle. The earth's magnetic field varies and is dependent on the particular surroundings of the parking lot. The presence or absence of a motor vehicle on the parking lot may be established in the process based on the change in the earth's magnetic field.

SUMMARY

The present invention relates to a method for determining an occupancy state of a parking space of a parking facility. In accordance with an example embodiment of the present invention, the method includes at least the following method steps:
a. detecting magnetic field measured values in the surroundings of the parking space along an axis with the aid of a magnetic field sensor within a predefined duration;
b. forming a Poincaré diagram as a function of the magnetic field measured values detected in method step a;
c. determining a line of best fit through the points of the Poincaré diagram formed in method step b;
d. determining differences in the vertical direction of the Poincaré diagram between the line of best fit and the respective points of the Poincaré diagram;
e. calculating a mean value of the differences determined in method step d; and
f. determining the occupancy state of the parking space as a function of the mean value calculated in method step e.

A parking facility includes here at least one parking space. This parking space is accordingly suitable for parking a motor vehicle thereon. The parking facility may be a conventional parking lot, for example, or also a parking garage or a parking zone.

An occupancy state of the parking space shall be understood to mean whether the parking space is occupied by a motor vehicle or whether the parking space is free.

A Poincaré diagram is formed by representing in each case two temporally adjoining measured values as a point in a two-dimensional diagram, the first measured value serving as the abscissa, and the second measured value serving as the ordinate of the particular point. This is carried out for all detected magnetic field measured values, resulting in the corresponding Poincaré diagram.

The direction in parallel to the ordinate shall be understood as the vertical direction of the Poincaré diagram.

The line of best fit may, in particular, be determined with the aid of a linear regression. Particularly preferably, a Monte Carlo method may be used in the process, which has the advantage that it may be applied in an embedded system.

As an alternative, the line of best fit may also be determined with the aid of a method of least squares, which approximates a first degree polynomial to the points of the Poincaré diagram.

It is advantageous in the process that it is possible to determine, as a result of the example method, whether a parking space is occupied or not. The determination has a very high probability of being correct. Moreover, the method is usable regardless of the location and does not require any prior calibration.

This is due to the fact that a partially chaotic system may be brought into a new reference system through the use of the Poincaré diagram, in which the corresponding states are considerably more easily apparent than before. This, in turn, is based on the summary of adjoining measured values in a respective point of the Poincaré diagram.

In one example embodiment of the method according to the present invention, it is provided that a sub-method step f1 runs in method step f, in which the mean value is compared to a predefined threshold value, the parking space being determined as occupied in a sub-method step f2 if the mean value is greater than the threshold value, or the parking space being determined as unoccupied in a sub-method step f3 if the mean value is smaller than or equal to the threshold value. In particular, the predefined threshold value is 0.1.

It is advantageous in the process that the detected magnetic field measured values deviate more strongly from one another in the case of an occupied parking space than in the case of a free parking space. This may, in turn, be utilized by a corresponding threshold value to determine the actual occupancy state of the parking space.

In one example embodiment of the method according to the present invention, it is provided that a method step g runs between method step a and method step b, in which a respective maximum of two temporally consecutively detected magnetic field measured values is determined for all detected magnetic field measured values, the Poincaré diagram in method step b being formed as a function of the determined maxima.

It is advantageous in the process that a prefiltering takes place by the formation of the maximum values of two adjoining magnetic field measured values in each case. In this way, it may be achieved that a noise superimposed on the magnetic field measured values, caused by a temperature drift or by other external influences, for example, has lesser effects on the method or on the result obtained by the method. In this way, the occupancy state has an even greater probability of having been correctly determined.

Maxima shall be understood to mean the greater magnetic field measured value, in absolute terms, of two adjoining magnetic field measured values. For example, if there are four consecutively detected magnetic field measured values MM1_1, MM1_2, MM1_3 and MM1_4, 3 maxima may be formed therefrom. These maxima are the maximum of MM1_1 and MM1_2, the maximum of MM1_2 and MM1_3, and the maximum of MM1_3 and MM1_4. These maxima may then, in turn, be used to form the Poincaré diagram.

In one example embodiment of the method according to the present invention, it is provided that all method steps are repeated, further magnetic field measured values being detected along a further axis, instead of the magnetic field measured values, during the repetition in method step a, and the subsequent method steps being carried out as a function of these further magnetic field measured values, the axis and the further axis intersecting and, in particular, being situated perpendicularly to one another.

It is advantageous in the process that influences on the magnetic field are often pronounced to different degrees in different directions. In this way, the influences in different directions may be detected by the method and used to determine the occupancy state of the parking space. Due to the sequential determination, in particular, the necessary computing power may be kept low. The method may, of course, be accordingly repeated for an arbitrary number of further axes, which intersect in each case.

In one example embodiment of the method according to the present invention, it is provided that further magnetic field measured values are detected in method step a in the surroundings of the parking space along at least one further axis within the predefined duration, the axis and the further axis differing from one another in their respective orientation, in particular, being oriented perpendicularly with respect to one another, and the subsequent method steps being additionally also carried out for the further magnetic field measured values.

It is advantageous in the process that influences on the magnetic field are often pronounced to different degrees in different directions. In this way, the influences in different directions may be detected by the method and used to determine the occupancy state of the parking space.

In particular, the magnetic field measured values and the further magnetic field measured values may be processed in parallel to obtain a prompt result of the determination of the occupancy state.

In one example embodiment of the method according to the present invention, it is provided that the occupancy state which was determined as a function of the magnetic field measured values is compared to the occupancy state which was determined as a function of the further magnetic field measured values.

It is advantageous in the process that a verification or plausibility check of the result as to whether the parking space is occupied or free may be carried out. If the results of the two determinations of the occupancy states along different axes agree, it may be assumed with even higher probability that the particular result is correct.

The determined occupancy state may be forwarded to a parking guidance system, for example, which due to the occupancy state effectuates an unblocking or a blocking of the parking space, or may also be processed internally by the device. The device, for example, may include a display with the aid of which it is clearly visible whether the parking space is free or occupied.

The present invention furthermore relates to a device for determining an occupancy state of a parking space of a parking facility. The device includes a magnetic field sensor and a processing unit. The processing unit is additionally configured to carry out a method according to the present invention.

It is advantageous in the process that it is possible to determine, by the device, whether a parking space is occupied or not. The determination has a very high probability of being correct. The device may be used regardless of the location, no additional calibration of the device being necessary. This is due to the fact that a partially chaotic system may be brought into a new reference system through the use of the Poincaré diagram, in which the corresponding states are considerably more easily apparent than by an analysis of the pure magnetic field measured values. Consequently, it is also possible to distinguish the states better from one another. This, in turn, is based on the summary of adjoining measured values in a respective point of the Poincaré diagram.

The present invention furthermore relates to a parking facility including at least one parking space for at least one vehicle, the parking space including at least one device according to the present invention.

DETAILED DESCRIPTION OF EXAMPLE EMBODIMENTS

Figure 1:
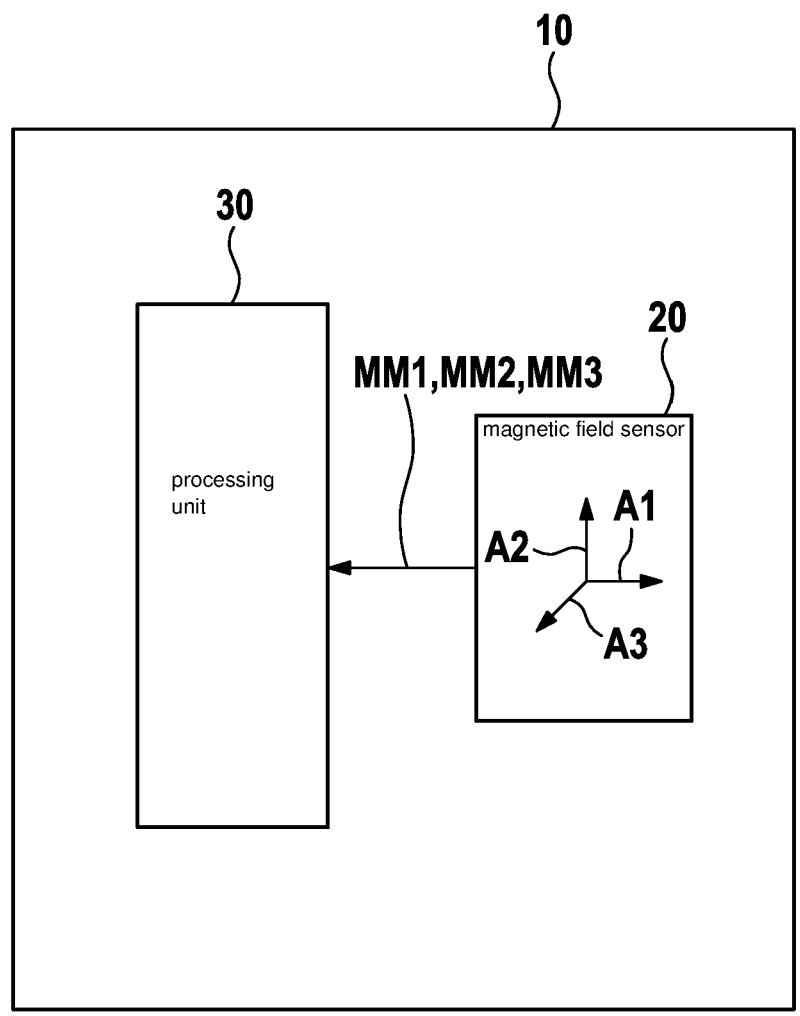
FIG. 1 shows one exemplary embodiment of a device according to the present invention for determining an occupancy state of a parking space.

FIG. 1 shows one exemplary embodiment of a device according to the present invention for determining an occupancy state of a parking space.

A device 10 is shown. Device 10 includes a magnetic field sensor 20 and a processing unit 30. Magnetic field sensor 20 may be designed as a uniaxial sensor and connected to processing unit 30, this connection being designed to be hardwired, but alternatively also possibly being wireless. If needed, magnetic field sensor 20 may also be designed to be biaxial or triaxial. Magnetic field sensor 20 is moreover designed to detect the magnetic field in its surroundings. A uniaxial magnetic field sensor 20 is able to detect the magnetic field accordingly along one axis A1. If, in contrast, magnetic field sensor 20 is designed to be multiaxial, it is also able to detect the magnetic field, for example, along further axes A2 and/or A3. Processing unit 30 is accordingly configured to detect magnetic field measured values MM1 along axis A1 and, if necessary, further magnetic field measured values MM2, MM3 along further axes A2, A3 with the aid of magnetic field sensor 20 and to carry out a method according to the present invention, which is described hereafter in greater detail together with FIG. 3.

Figure 2:
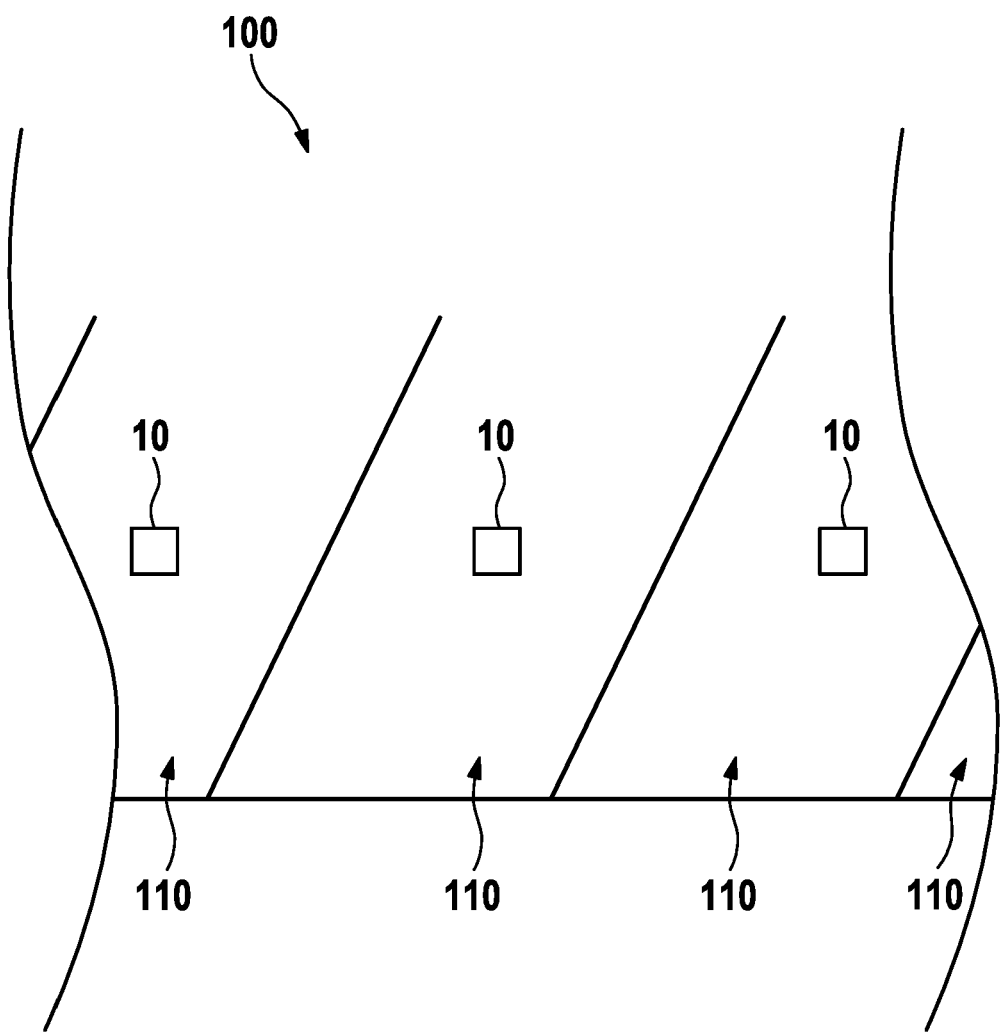
FIG. 2 shows one exemplary embodiment of a parking facility according to the present invention.

FIG. 2 shows one exemplary embodiment of a parking facility according to the present invention. A parking facility 100 for motor vehicles is shown, which includes multiple parking spaces 110. Parking facility 100 may be a conventional parking lot, for example, or a parking garage or a parking zone. As an alternative, it would also be conceivable that parking facility 100 only includes one parking space 110. Parking space 110 includes a device 10, magnetic field measured values MM1 and, if necessary, further magnetic field measured values MM2 and/or MM3 in the surroundings of parking space 110 being detectable with the aid of magnetic field sensor 20 of device 10. Device 10 may, for example, be recessed in the ground of parking space 110 or be mounted thereon. If parking space 110 includes a ceiling, device 10 may alternatively also be situated there.

Processing unit 30 of device 10 could also be situated externally and, for example, be designed as a server.

Figure 3:
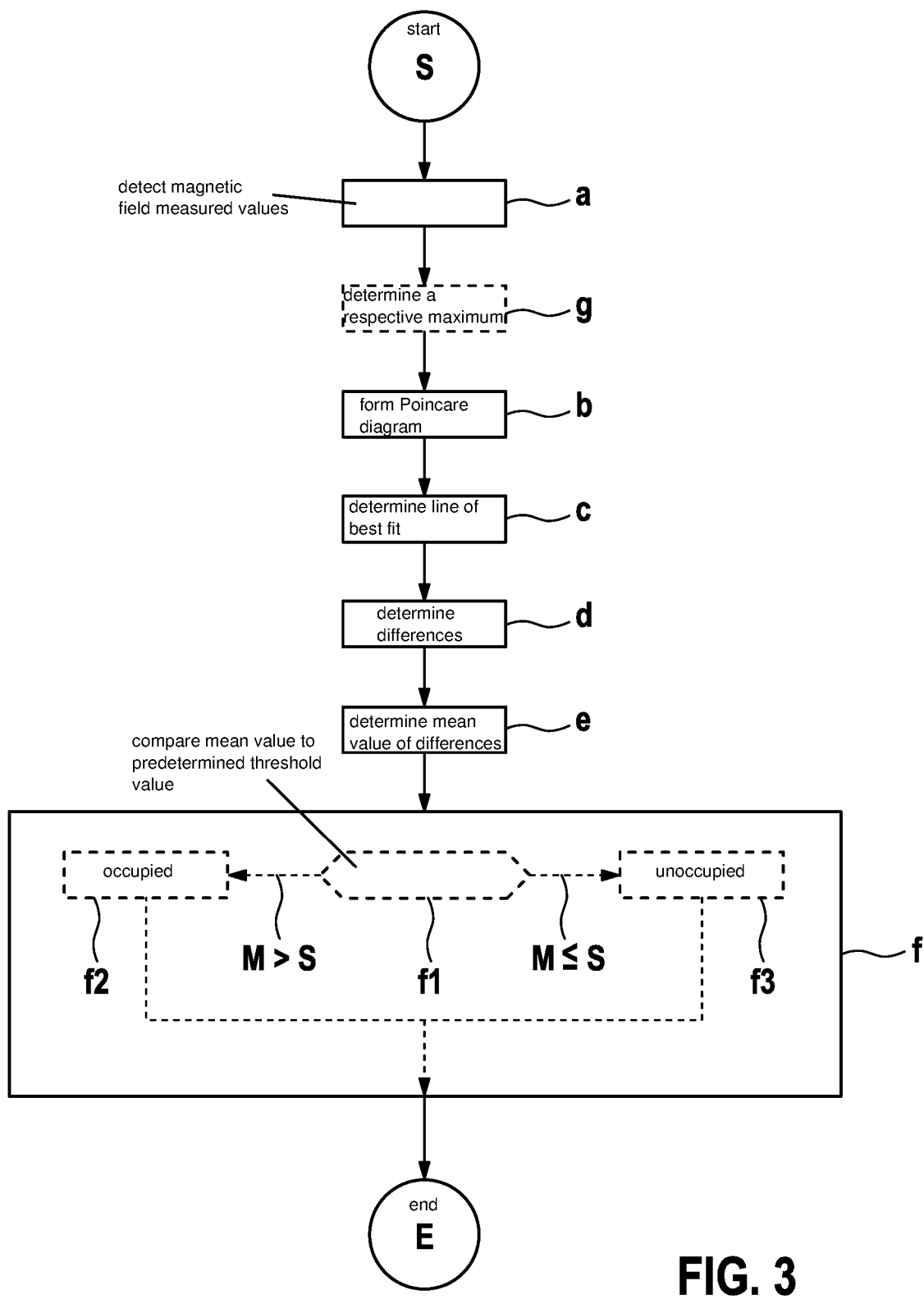
FIG. 3 shows one exemplary embodiment of a method according to the present invention for determining an occupancy state of a parking space.

FIG. 3 shows one exemplary embodiment of a method according to the present invention for determining an occupancy state of a parking space.

In the method according to this exemplary embodiment, after start S, magnetic field measured values MM1 are detected in a method step a in the surroundings of parking space 110 in the direction of one axis A1 with the aid of a magnetic field sensor 20. Magnetic field measured values MM1 are detected over a predetermined duration using a predetermined sampling rate. A typical sampling rate is 10 Hz, and, for example, 128 magnetic field values are detected in the direction of axis A1, resulting in a duration for the detection of 12.8 s. Typically, no change in the occupancy state of parking space 110 occurs in such a short duration.

Subsequent to method step a, a Poincaré diagram is formed in a method step b as a function of magnetic field measured values MM1 detected in method step a. In each case, two temporally consecutively detected magnetic field measured values MM1_$n$ and MM1_$n$+1 are taken, and a point is plotted in a two-dimensional diagram as a function of the two magnetic field measured values MM1_$n$ and MM1_$n$+1. The respective point is defined in that magnetic field measured value MM1_$n$ temporally detected first serves as the abscissa, and magnetic field measured value MM1_$n$+1 detected temporally thereafter serves as the ordinate. This is carried out for all magnetic field measured values MM1 detected in method step a.

Figure 4:
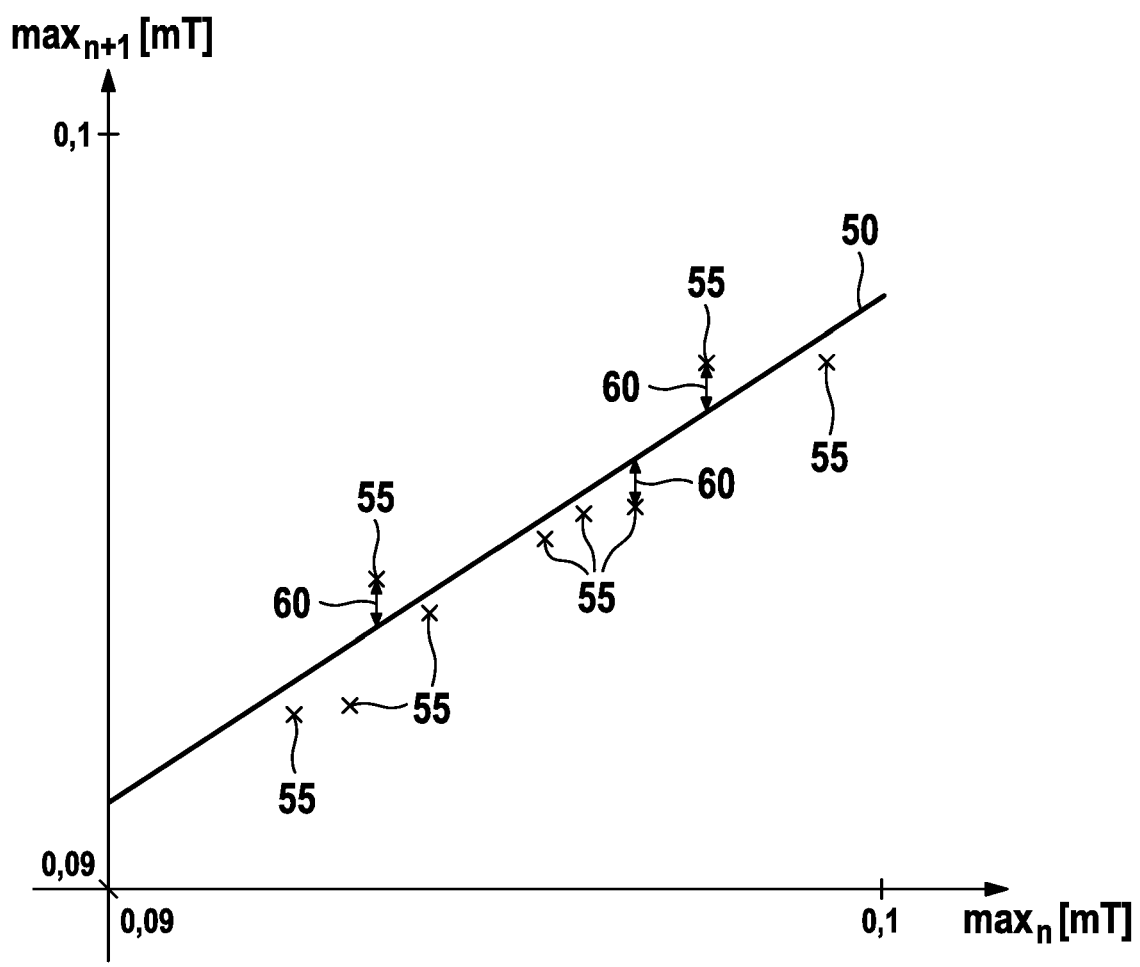
FIG. 4 shows a typical Poincaré diagram for a free occupancy state of a parking space.

Optionally, a method step g also runs between method step a and method step b, in which the respective maxima of two temporally consecutively detected magnetic field measured values MM1_$n$ and MM1_$n$+1 are determined for all detected magnetic field measured values MM1, the Poincaré diagram being formed thereupon in method step b as a function of the determined maxima, again two maxima to be categorized as temporally consecutive being represented as a point 55. Such an exemplary Poincaré diagram is shown in FIG. 4.

Thereafter, in a method step c, a line of best fit 50 is determined through points 55 of Poincaré diagram formed in method step b. In particular, this line of best fit 50 is determined with the aid of a method of least squares or with the aid of a linear regression. In the case of the linear regression, a Monte Carlo method may particularly preferably be used.

Thereafter, in a method step d, differences 60 are determined in the vertical direction of the Poincaré diagram between line of best fit 50 and the respective points 55 of the Poincaré diagram.

Thereupon, a mean value M of differences 60 determined in method step d are determined in a method step e.

Finally, in a method step f, the occupancy state of parking space 110 is determined as a function of mean value M calculated in method step e. The corresponding mean value M may, for example, be compared in a sub-method step f1 to a predetermined threshold value S. This threshold value may be 0.1, for example. If the comparison shows that mean value M is greater than threshold value S, it is determined in a sub-method step f2 that parking space 110 is occupied. If, in contrast, the comparison shows that mean value M is smaller than or equal to threshold value S, it is determined in a sub-method step f3 that parking space 110 is free.

In one exemplary embodiment which is not shown, all previously carried out method steps may be repeated, further magnetic field measured values MM2 being detected along a further axis A2, instead of magnetic field measured values MM1, during the repetition in method step a, and the subsequent method steps being carried out as a function of these further magnetic field measured values, axis A1 and further axis A2 differing from one another in their respective orientation, in particular, being oriented perpendicularly with respect to one another. Accordingly, the method could also be repeated for further magnetic field measured values MM3, for example, which are detected along a further axis A3.

In one further exemplary embodiment which is not illustrated, further magnetic field measured values MM2 are detected in method step a in the surroundings of the parking space along at least one further axis A2 within the predefined duration, axis A1 and further axis A2 differing from one another in their respective orientation, in particular, being oriented perpendicularly with respect to one another, and the subsequent method steps being additionally also carried out for further magnetic field measured values MM2. The additional carrying out of these method steps may take place in parallel to the actual method steps.

Optionally, in the two exemplary embodiments not illustrated, the occupancy state which was determined as a function of magnetic field measured values MM1 may also be compared to the occupancy state which was determined as a function of further magnetic field measured values MM2. In this way, the determined occupancy states may be subjected to a plausibility check.

FIG. 4 shows a typical Poincaré diagram for a free occupancy state of a parking space.

The respective maximum of two temporally consecutively detected magnetic field measured values MM1_$n$ and MM1_$n$+1 is plotted in millitesla on the abscissa, and the respective temporally subsequent maximum is also plotted in millitesla on the ordinate. The maximum of two temporally consecutively detected magnetic field measured values MM1_$n$ and MM1_$n$+1 and the correspondingly temporally subsequent maximum then result in the respective points 55. Moreover, a line of best fit 60 through points 55 is shown, which is to approximate points 55 in the best possible manner. Moreover, differences 60 are shown, which represent the respective distances in the parallel direction to the ordinate of the Poincaré diagram between line of best fit 50 and the respective points 55.

What is claimed is:

1. A method for determining an occupancy state of a parking space of a parking facility, the method comprising the following steps:
   a. detecting magnetic field measured values in surroundings of the parking space along an axis using a magnetic field sensor within a predefined duration;
   b. forming a Poincaré diagram as a function of the magnetic field measured values detected in step a;
   c. determining a line of best fit through points of the Poincaré diagram formed in step b, using linear regression;
   d. determining differences in a vertical direction of the Poincaré diagram between the line of best fit and the points;
   e. calculating a mean value of the differences determined in step d; and
   f. determining the occupancy state of the parking space as a function of the mean value calculated in step e;
   wherein in step b, in the forming of the Poincaré diagram, a respective maxima of two temporally consecutively detected values of the magnetic field measured values is determined for all of the detected magnetic field measured values, and each point of the Poincaré diagram is determined using two temporally consecutive ones of the respective maximas.

2. The method as recited in claim 1, wherein step f includes a sub-method step f1 in which the mean value is compared to a predefined threshold value, (i) the parking space being determined as occupied in a sub-method step f2 when the mean value is greater than the threshold value, or (ii) the parking space being determined as unoccupied in a sub-method step f3 when the mean value is smaller than or equal to the threshold value.

3. The method as recited in claim 2, wherein threshold value is 0.1.

4. The method as recited in claim 1, wherein all method steps are repeated, further magnetic field measured values being detected along a further axis, instead of the magnetic field measured values, during the repetition in method step a, and the subsequent method steps being carried out as a function of the further magnetic field measured values, the axis and the further axis intersecting.

5. The method as recited in claim 4, wherein the axis and the further axis are situated perpendicularly to one another.

6. The method as recited in claim 1, wherein further magnetic field measured values are detected in method step a in the surroundings of the parking space along at least one further axis within the predefined duration, the axis and the further axis being situated perpendicularly to one another, and the subsequent method steps being additionally also carried out for the further magnetic field measured values.

7. The method as recited in claim 4, wherein the occupancy state which was determined as a function of the magnetic field measured values is compared to the occupancy state which was determined as a function of the further magnetic field measured values.

8. A device for determining an occupancy state of a parking space of a parking facility, the device comprising:
   a magnetic field sensor; and
   a processing unit, the processing unit configured to:
      a. detect magnetic field measured values in surroundings of the parking space along an axis using the magnetic field sensor within a predefined duration;
      b. form a Poincaré diagram as a function of the magnetic field measured values detected in a;
      c. determine a line of best fit through points of the Poincaré diagram formed in b, using linear regression;
      d. determine differences in a vertical direction of the Poincaré diagram between the line of best fit and the points;
      e. calculate a mean value of the differences determined in d; and
      f. determine the occupancy state of the parking space as a function of the mean value calculated in e;
   wherein in b, a respective maxima of two temporally consecutively detected values of the magnetic field measured values is determined for all of the detected magnetic field measured values, and each point of the Poincaré diagram is determined using two temporally consecutive ones of the respective maximas.

9. A parking facility for at least one vehicle, the parking facility comprising:
   at least one parking space which includes at least one device for determining an occupancy state of a parking space of a parking facility, the device including:
      a magnetic field sensor; and
      a processing unit, the processing unit configured to:
         a. detect magnetic field measured values in surroundings of the parking space along an axis using the magnetic field sensor within a predefined duration;
         b. form a Poincaré diagram as a function of the magnetic field measured values detected in a;
         c. determine a line of best fit through points of the Poincaré diagram formed in b, using linear regression;
         d. determine differences in a vertical direction of the Poincaré diagram between the line of best fit and the points;
         e. calculate a mean value of the differences determined in d; and
         f. determine the occupancy state of the parking space as a function of the mean value calculated in e;
      wherein in b, a respective maxima of two temporally consecutively detected values of the magnetic field measured values is determined for all of the detected magnetic field measured values, and each point of the Poincaré diagram is determined using two temporally consecutive ones of the respective maximas.

* * * * *